(12) United States Patent
Lehoux-Lebacque et al.

(10) Patent No.: US 11,499,836 B2
(45) Date of Patent: Nov. 15, 2022

(54) METHOD FOR PREPROCESSING A SET OF NON-SCHEDULED LINES WITHIN A MULTIMODAL TRANSPORTATION NETWORK OF PREDETERMINED STATIONS AND FOR COMPUTING AT LEAST ONE ITINERARY FROM A DEPARTURE LOCATION TO AN ARRIVAL LOCATION

(71) Applicant: Naver Corporation, Seongnam-si (KR)

(72) Inventors: Vassilissa Lehoux-Lebacque, Corenc (FR); Darko Drakulic, Grenoble (FR)

(73) Assignee: Naver Corporation, Gyeonggi-do (KR)

( * ) Notice: Subject to any disclaimer, the term of this patent is extended or adjusted under 35 U.S.C. 154(b) by 310 days.

(21) Appl. No.: 16/830,621

(22) Filed: Mar. 26, 2020

(65) Prior Publication Data

US 2020/0378773 A1 Dec. 3, 2020

(30) Foreign Application Priority Data

May 29, 2019 (EP) .................................... 19305689

(51) Int. Cl.
*G01C 21/34* (2006.01)
*G06Q 10/04* (2012.01)
*G06Q 50/14* (2012.01)

(52) U.S. Cl.
CPC ....... *G01C 21/3423* (2013.01); *G01C 21/343* (2013.01); *G01C 21/3446* (2013.01);
(Continued)

(58) Field of Classification Search
CPC .. G06Q 50/14; G06Q 10/047; G01C 21/3453; G01C 21/3446; G01C 21/343; G01C 21/3423
See application file for complete search history.

(56) References Cited

U.S. PATENT DOCUMENTS 5,991,688 A 11/1999 Fukushima et al.
6,779,060 B1 8/2004 Azvine et al.
(Continued)

FOREIGN PATENT DOCUMENTS

EP 3339806 A1 6/2018
JP 2007520685 7/2007
(Continued)

OTHER PUBLICATIONS

U.S. Appl. No. 16/853,914, filed Apr. 21, 2020, entitled, "Method for Computing an Itinerary From a Departure Location To an Arrival Location" 2020.
(Continued)

*Primary Examiner* — Yazan A Soofi

(57) ABSTRACT

A method preprocesses a set of non-scheduled lines within a multimodal transportation network of predetermined stations, by (a) for each non-scheduled line (l) of the set of non-scheduled lines, associating, to each station ($p_i^l$) of a sequence of stations ($\vec{p}(l)$) defining the non-scheduled line (l), at least one time interval (I(l,j)) during which a trip on the non-scheduled line (l) can depart from the station ($p_i^l$); (b) for each first station ($p_i^l$) of a non-scheduled line (l) which is reachable from a second station ($p_t^{t'}$) of a scheduled line, adding to a set of feasible transfers between a scheduled line and a non-scheduled line, if there exists a trip (t) on the scheduled line such that a departure time at the first station ($p_i^l$) after transferring is compatible with the at least one time interval (I(l,j)) associated to the first station ($p_i^l$), the earliest transfer from the second station ($p_t^{t'}$) on the trip (t) to the first station ($p_i^l$); and (c) outputting the set of feasible transfers between a scheduled line and a non-scheduled line for computing at least one itinerary in the multimodal transportation network.

39 Claims, 7 Drawing Sheets

(52) U.S. Cl.
CPC ....... *G01C 21/3453* (2013.01); *G06Q 10/047* (2013.01); *G06Q 50/14* (2013.01)

(56) References Cited

U.S. PATENT DOCUMENTS

| | | |
|---|---|---|
| 6,785,608 B1 | 8/2004 | Milici et al. |
| 8,417,409 B2 | 4/2013 | Bast et al. |
| 8,494,771 B2 | 7/2013 | Delling et al. |
| 9,082,134 B2* | 7/2015 | Gishen ............... G06Q 30/0261 |
| 2002/0059025 A1 | 5/2002 | Kim et al. |
| 2003/0109266 A1 | 6/2003 | Rafiah et al. |
| 2004/0218536 A1 | 11/2004 | Yasukawa et al. |
| 2005/0043884 A1 | 2/2005 | Atarashi |
| 2007/0008949 A1 | 1/2007 | Balandin |
| 2008/0075007 A1 | 3/2008 | Mehta et al. |
| 2010/0036606 A1 | 2/2010 | Jones |
| 2010/0082245 A1 | 4/2010 | Patenaude et al. |
| 2010/0228574 A1 | 9/2010 | Mundinger et al. |
| 2010/0280748 A1 | 11/2010 | Mundinger et al. |
| 2010/0280853 A1 | 11/2010 | Petralia et al. |
| 2010/0305984 A1 | 12/2010 | Ben-Yitschak et al. |
| 2011/0112759 A1 | 5/2011 | Bast et al. |
| 2011/0125666 A1 | 5/2011 | Laurent et al. |
| 2014/0257697 A1 | 9/2014 | Gishen |
| 2014/0278086 A1* | 9/2014 | San Filippo ....... G01C 21/3423 701/527 |
| 2014/0343974 A1 | 11/2014 | Graells et al. |
| 2015/0371157 A1 | 12/2015 | Jaffe |
| 2016/0033283 A1* | 2/2016 | Ulloa Paredes ....... G06Q 10/04 701/465 |
| 2016/0203422 A1* | 7/2016 | Demarchi ............... G06F 16/29 705/6 |
| 2017/0123421 A1* | 5/2017 | Kentley ................ G06Q 10/00 |
| 2018/0038706 A1* | 2/2018 | Ellenby ................... G06F 16/29 |
| 2018/0102985 A1* | 4/2018 | Byers ...................... H04L 47/80 |
| 2019/0057340 A1* | 2/2019 | Wang ...................... G06F 16/29 |
| 2019/0130350 A1* | 5/2019 | Nguyen ............. G06Q 10/0834 |
| 2019/0383621 A1* | 12/2019 | Isaacs ................. G06Q 30/0282 |
| 2019/0383622 A1* | 12/2019 | Aich ................... G01C 21/3423 |
| 2019/0383623 A1* | 12/2019 | Aich .................... G06Q 10/047 |
| 2019/0392368 A1* | 12/2019 | Raghunathan ............................. G06Q 10/063116 |
| 2020/0134747 A1* | 4/2020 | Zhang ................. G06F 16/9535 |
| 2020/0182637 A1* | 6/2020 | Kumar ................... G06Q 50/14 |
| 2020/0272954 A1* | 8/2020 | Serra ..................... G01C 21/343 |
| 2020/0378773 A1* | 12/2020 | Lehoux-Lebacque ....................... G01C 21/343 |
| 2022/0065651 A1* | 3/2022 | Beaurepaire ....... G01C 21/3661 |
| 2022/0095079 A1* | 3/2022 | Volkerink ............... H04W 4/80 |

FOREIGN PATENT DOCUMENTS

| | | |
|---|---|---|
| JP | 2013511095 | 3/2013 |
| JP | 2014032139 A | 2/2014 |
| JP | 2016045020 | 4/2016 |
| JP | 2017075967 A | 4/2017 |
| JP | 2018109621 A | 7/2018 |
| WO | 2005013234 A1 | 2/2005 |
| WO | WO2008142783 A1 | 11/2008 |
| WO | WO 2017/185832 A1 | 11/2017 |

OTHER PUBLICATIONS

Moritz Baum, Valentin Buchhold, Jonas Sauer, Dorothea Wagner, and Tobias Zündorf. Unlimited transfers for multi-modal route planning: An efficient solution. In Proceedings of ESA 2019, to appear, 2019. 2019.

Vassilissa Lehoux and Darko Drakulic. Mode Personalization in Trip-Based Transit Routing. In Gianlorenzo D'Angelo and Twan Dollevoet, editors, 19th Workshop on Algorithmic Approaches for Transportation Modelling, Optimization, and Systems (ATMOS 2019), vol. 75 of OpenAccess Series in Informatics (OASIcs), Dagstuhl, Germany, 2019, Schloss Dagstuhl-Leibniz-Zentrum fuer Informatik. 2019.

Duc-Minh Phan and Laurent Viennot. Fast public transitrouting with unrestrict-edwalking through hub labeling. In Proceedings of the Special Event on Analysis of Experimental Algorithms (SEA2), Lecture Notes in Computer Science. Springer, 2019. 2019.

I Ie le De France Mobilités. Open data, https://www.iledefrance-mobilites.fr 2019.

Dorothea Wagner and Tobias Zu''ndorf. Public Transit Routing with Unrestricted Walking, In Gianlorenzo D'Angelo and Twan Dollevoet, editors, 17th Workshop on Algorithmic Approaches for Transportation Modelling, Optimization, and Systems (ATMOS 2017), vol. 59 of OpenAccess Series in Informatics (OASIcs), pp. 7:1-7:14, Dagstuhl, Germany, 2017, Schloss Dagstuhl-Leibniz-Zentrum fuer Informatik, 2017.

U.S. Appl. No. 16/995,969, filed Aug. 18, 2020, entitled, "Method for Computing an Itinerary From a Departure Location to an Arrival Location" 2020.

Hannah Bast, Mirko Brodesser, and Sabine Storandt. Result Diversity for Multi-Modal Route Plan-ning. In Daniele Frigioni and Sebastian Stiller, editors, 13th Workshop on Algorithmic Approaches for Transportation Modelling, Optimization, and Systems, vol. 33 of OpenAccess Series in Infonmatics (OASIcs), pp. 123-136, Dagstuhl, Germany, 2013. Schloss Dagstuhl-Leibniz-Zentrum fuer Informatik 2013.

Julian Dibbelt, Thomas Pajor, and Renato F. Werneck. Public transit labeling. In Bampis E., editor, Experimental Algorithms SEA 2015, vol. 9125 of Lecture Notes in Computer Science. Springer, 2015 2015.

Artigues, Christian, Marie-josé Huguet, Fallou Gueye, Frédéric Schettini, and Laurent Dezou. State-Based Accelerations and Bidirectional Search for Bi-Objective Multi-Modal Shortest Paths, 2013. 2013.

Barrett, Chris, Riko Jacob, and Madhav Marathe. 'Formal-Language-Constrained Path Problems'. SIAM Journal on Computing 30 (2000): 200-0. 2000.

Bast, Hannah, Mirko Brodesser, and Sabine Stor. 'Result Diversity for Multi-Modal Route Planning'. In 13th Workshop on Algorithmic Approaches for Transportation Modelling, Optimization, and Systems, vol. 33 of OpenAccess Series in Informatics (OASIcs), pp. 123-136, Dagstuhl, 2013. 2013.

Bast, Hannah, Erik Carlsson, Amo Eigenwillig, Robert Geisberger, Chris Harrelson, Veselin Raychev, and Fabien Viger. 'Fast Routing in Very Large Public Transportation Networks Using Transfer Patterns'. In In Proceedings of the 18th Annual European Conference on Algorithms: Part I, ESA'10, 290-301. Springer-Verlag, 2010. 2010.

Bast, Hannah, Daniel Delling, Andrew V. Goldberg, Matthias Muller-hannemann, Thomas Pajor, Peter Sanders, Dorothea Wagner, and Renato F. Werneck. 'Route Planning in Transportation Networks', 2014. 2014.

Delling, Daniel, Julian Dibbelt, Thomas Pajor, Dorothea Wagner, and Renato F. Werneck. Computing Multimodal Journeys in Practice?, n.d. 2018.

Daniel Delling, Thomas Pajor, and Renato F. Werneck. Round-based public transit routing. In Proceedings of the Fourteenth Workshop on Algorithm Engineering and Experiments (ALENEX), 2013. 2013.

Dibbelt, Julian, Thomas Pajor, Ben Strasser, and Dorothea Wagner. 'Intriguingly Simple and Fast Transit Routing'. In In SEA, vol. 7933 of LNCS, 43-54. Springer, 2013. 2013.

Julian Dibbelt, Thomas Pajor, and Dorothea Wagner. User-constrained multi-modal route plan¬ning. In SIAM, editor, Proceedings of the 14th Meeting on Algorithm Engineering and Experiments (ALENEX12), p. 118129, 2012 2012.

Garey M. R. and D. S. Johnson. Computers and intractability: A guide to the theory of NP-completeness. Freeman, 1979. 1979.

Geisberger, Robert, Peter Sanders, Dominik Schultes, and Daniel Delling. 'Contraction Hierarchies: Faster and Simpler Hierarchical Routing in Road Networks'. In Experimental Algorithms, edited by

(56) References Cited

OTHER PUBLICATIONS

Catherine C. McGeoch, 5038:319-33. Berlin, Heidelberg: Springer Berlin Heidelberg, 2008. https://doi.org/10.1007/978-3-540-68552-4_24. 2008.

Goldberg, Andrew V., and Chris Harrelson. 'Computing the Shortest Path: A Search Meets Graph Theory'. In Proceedings of the Sixteenth Annual ACM-SIAM Symposium on Discrete Algorithms, 156-165. SODA '05. Vancouver, British Columbia: Society for Industrial and Applied Mathematics, 2005 2005.

Hansen, Pierre. 'Bicriterion Path Problems'. In Multiple Criteria Decision Making Theory and Application, edited by Günter Fandel and Tomas Gal, 177:109-27. Berlin, Heidelberg: Springer Berlin Heidelberg, 1980. https://doi.org/10.1007/978-3-642-48782-8_9. 1980.

Idri, Abdelfattah, Mariyem Oukarfi, Azedine Boulmakoul, Karine Zeitouni, and All Masri. 'A Distributed Approach for Shortest Path Algorithm in Dynamic Multimodal Transportation Networks'. Transportation Research Procedia 27 (2017): 294-300. https://doi.org/10.1016/j.trpro.2017.12.094. 2017.

Kirchler, Dominik. 'Efficient Routing on Multi-Modal Transportation Networks'. Phdthesis, Ecole Polytechnique X, 2013. https://pastel.archives-ouvertes.fr/pastel-00877450. 2013.

Liu, Lu, and Liqiu Meng. 'Algorithms of Multi-Modal Route Planning Based on the Concept of Switch Point'. Photogrammetrie—Fernerkundung—Geoinformation 2009, No. 5 (Nov. 1, 2009): 431-44. https://doi.org/10.1127/1432-8364/2009/0031. 2009.

Office Action from Japanese Patent Office for Japanese Patent Application No. 2020-093731 (Japanese copunter part to U.S. Appl. No. 16/830,621) dated Mar. 23, 2021 2021.

English Translation of Abstract of Published Japanese Patent Application No. JP 2014-032139 (A) 2014.

English Translation of Abstract of Published Japanese Patent Application No. JP 2017-075967 (A) 2017.

English Translation of Abstract of Published Japanese Patent Application No. JP 2018-109621 (A) 2018.

Liu, Xudong, Christian Fritz, and Matthew Klenk. 'On Extensibility and Personalizability of Multi-Modal Trip Planning', n. d., 7. 2018.

Ulloa Luis, Lehoux Vassilissa, Roulland Frederic. Trip planning within a multimodal urban mobility, IET Intelligent Transport Systems, 12(2):87-92, 2018. 2018.

Witt, Sascha. 'Trip-Based Public Transit Routing'. ArXiv:1504.07149 [Cs] 9294 (2015): 1025-36. https://doi.org/10.1007/978-3-662-48350-3_85. 2015.

Witt, Sacha. Trip-based public transit routing using condensed search trees. In Marc Goerigk and Renato Werneck, editors, 16th Workshop on Algorithmic Approaches for Transporation Modelling, Optimization, and Systems (ATMOS16), No. 10, 2016. 2016.

Bast, Hannah, Daniel Delling, Andrew Goldberg, Matthias Müller-Hannemann, Thomas Pajor, Peter Sanders, Dorothea Wagner, and Renato F. Werneck. 'Route Planning in Transportation Networks'. ArXiv:1504.05140 [Cs], Apr. 20, 2015. http://arxiv.org/abs/1504.05140. 2015.

Web page: https://data.grandlyon.com/ Home • Métropolitan Data of the Grand Lyon.Pdf, n.d. 2018.

Web page : https://opendata.stif.info. 'Home page—Portail Open Data Île-de-France Mobilités —Open Data Île-de-France Mobilités. Pdf', n.d. 2018.

"General transit feed standard format reference documentation," https://developers.google.com/transit/gtfs/reference/2018.

E. Cohen, E. Halperin, H. Kaplan, and U. Zwick. Reachability and distance queries via 2-hop labels. SIAM Journal on Computing, 32(5): 13381355, 2003 2003.

Matthias Hertel Hannah Bast and Sabine Storandt. Scalable transfer patterns. In Proceedings of the Eighteenth Workshop on Algorithm Engineering and Experiments (ALENEX), 2016 2016.

IΓIe le De France Mobilites. Open data, https://www.iledefrance-mobilites.fr 2018.

U.S. Appl. No. 16/830,609, filed Mar. 26, 2020, entitled, "Methods for Preprocessing a Set of Feasible Transfers for Computing Itineraries in a Multimodal Transportation Network" 2020.

U.S. Appl. No. 16/700,096, filed Dec. 2, 2019, entitled, "Method for Computing at Least One Itinerary From a Departure Location to an Arrival Location" 2019.

English Translation of Abstract of Published Japanese Patent Application No. JP 2007-520685 (A) Jul. 26, 2007 2007.

English Translation of Abstract of Published Japanese Patent Application No. JP 2016-045020 (A) Apr. 4, 2016 2016.

English Translation of Abstract of Published Japanese Patent Application No. JP 2013-511095 (A) Feb. 28, 2013 2013.

U.S. Appl. No. 17/335,402, filed Jun. 1, 2021, entitled, "Method for Computing a Personalized Itinerary From a Departure Location to an Arrival Location" 2021.

European Search Report for EP 19305687.6 (dated Jul. 25, 2019) dated Jul. 25, 2019.

European Search Report for EP 19305689.2 (dated Jul. 26, 2019) dated Jul. 26, 2019.

European Office Action (EP 19309089) for corresponding European Patent Application (dated Jul. 7, 2022).

* cited by examiner

```
procedure INITIALIZATION for each stop q such that Δτ_fp(q, p_tgt) is defined do
        Δτ ← 0 if p_tgt = q, else Δτ_fp(q, p_tgt)
        for each (L, i) ∈ L(q) do    -- Including the non-scheduled lines
            L ← L ∪ (L, i, Δτ + Δτ_ad(L))
        end for
    end for -- Initialization of the queue for 0 transfers
    for each stop q such that Δτ_fp(p_src, q) is defined do
        Δτ ← 0 if p_src = q, else Δτ_fp(p_src, q)
        for each (L, i) ∈ L(q) do    -- Including the non-scheduled lines
            if L ∈ L̂ then
                ENQUEUE_LINE(L, i, τ + Δτ_ad(L), 0)
            else
                t ← earliest(L, i, τ + Δτ_ad(L))
                ENQUEUE_TRIP(t, i, 0)
            end if
        end for
    end for end procedure
```

```
procedure ENQUEUE_TRIP(trip t, index i, number of transfers n)
                                    -- Adding the given trip parts to the queue
    if i < R(t) then
        Q_n ← Q_n ∪ {p_i^t → p_t^{iend}}
        for each trip u with t ≤ u ∧ L_t = L_u do
            R(u) ← min(R(u), i)
        end for
    end if
end procedure                                                         502
```

```
procedure ENQUEUE_LINE(Line l, index i, time τ,
                                    number of transfers n)
    require l ∈ L̂          -- Adding the earliest trip parts to the queue
    ind ← UPDATE_R(l, i, τ)
    if ind > i then
        Q_n ← Q_n ∪ {p_i^t → p_t^{iend}}
    end if
end procedure                                                         504
```

```
procedure UPDATE_R(Line l, index i, time τ)
    require l ∈ L̂
    output The maximum index for which R(l) is modified
      by taking the earliest trip, i - 1 if no modification is done.
    updated ← i
    t ← earliest(l, i, τ)
    while updated ≤ |t⃗(l)| ∧ τ_{dep}(t, updated) < R(l)[updated] do
        R(l)[updated] ← τ_{dep}(t, updated)
        updated ← updated + 1
    end while   -- The end of the trip is scanned or reached by an earlier trip
    return updated - 1
end procedure                                                         506
```

FIG. 5

```
-- Earliest arrival query
input Timetable data, transfer set T, Transfer to non-scheduled lines set T̂
input Source stop p_src, destination stop p_tgt, start time τ
output Result set J
J ← ∅, L ← ∅
Q_n ← ∅ for n = 0, 1, ...
R(.) ← ∞ for all trips t, R̂(.,.) ← ∞ for all lines without schedule l INITIALIZATION()
τ_min ← ∞                              -- The current minimum arrival time at target
n ← 0
while Q_n ≠ ∅ do
    for each p_i^t → p_j^t ∈ Q_n do
                                       -- Checking if a target is reached
        for each (L_t, i, Δτ) ∈ L with b < i and τ_arr(t, i) + Δτ < τ_min do
            τ_min ← τ_arr(t, i) + Δτ
            J ← J ∪ {(τ_min, n)}, removing dominated entries
        end for
        if τ_arr(t, b + 1) + Δτ_cl(L_t) < τ_min then
            •
            •
            •
        end if
    end for
    n ← n + 1
end while
```

FIG. 6

```
if τ_arr(t, b+1) + Δτ_al(L_t) < τ_min then    -- Filling the queue for the next round
    if L_t ∈ L̂ then                           -- Transfers must be computed
        for each stop p_t^i with b < i ≤ e do
            for each stop q such that Δτ_fp(p_t^i, q) is defined do
                τ ← Δτ_fp(p_t^i, q) + τ_arr(t, i) + Δτ_al(L_t)
                for each (L, k) ∈ L(q) do
                    if L ∈ L̂ then
                        ENQUEUE_LINE(L, k, τ + Δτ_bo(L), n + 1)
                    else
                        t' ← earliest(L, k, τ + Δτ_bo(L))
                        ENQUEUE_TRIP(t', k, n + 1)
                    end if
                end for
            end for
        end for
    else
        for each transfer p_t^i → p_u^j ∈ T with b < i ≤ e do
            ENQUEUE_TRIP(u, j, n + 1)
        end for
        for each (p_t^i → p_l^j, τ) ∈ T̂ do
            ENQUEUE_LINE(l, j, τ, n + 1)
        end for
    end if
end if
```

FIG. 7

METHOD FOR PREPROCESSING A SET OF NON-SCHEDULED LINES WITHIN A MULTIMODAL TRANSPORTATION NETWORK OF PREDETERMINED STATIONS AND FOR COMPUTING AT LEAST ONE ITINERARY FROM A DEPARTURE LOCATION TO AN ARRIVAL LOCATION

PRIORITY INFORMATION

Pursuant to 35 U.S.C. § 119 (a), this application claims the benefit of earlier filing date and right of priority to European Patent Application Number EP 19305689.2, filed on May 29, 2019, the contents of which are hereby incorporated by reference in their entirety.

BACKGROUND

A journey planner (also called trip planner) is a solver used to determine one or several itineraries from a departure location (the origin) to an arrival location (the destination), using one and/or more transport modes, in particular public transportation modes (e.g., subway, tram, bus, etc.). A journey planner is said to be "multimodal" when covering several transportation modes and allowing intermodal connections (i.e. transfers from a mode to another). Searches may be optimized on different criteria, for example fastest, shortest, least changes, and/or cheapest. For several criteria, the maximal set of optimal values is the Pareto front, while the maximal set of optimal solutions is the Pareto set. A planner is optimal if it returns either the Pareto set or the Pareto front. Searches may be constrained, for example, to leave and/or arrive at a certain time, to avoid certain waypoints, etc.

Public transport modes generally operate according to published schedules; given that public transport services only depart at specific times (unlike private modes of transportation such as driving, walking, and/or cycling, which may leave at any time), a journey planner algorithm must therefore not only find a path to a destination, but seek to optimize it so as to minimize the arrival time in this time-dependent setting.

One of the most performant algorithms used to this end is the "Trip-Based Public Transit Routing" algorithm ("Trip-Based Public Transit Routing Algorithm" and/or "TB algorithm"), which is a method based on iterations, similar to breadth-first search in a graph, where one iteration corresponds to taking a trip. It is disclosed in the document Sacha Witt. *Trip-based public transit routing*. In N. Bansal and I. Finocchi, editors, ESA 2015, volume 9294 of *Lecture Notes in Computer Science*, Berlin, Heidelberg, 2015. Springer.

The TB algorithm is an algorithm for computing the Pareto front along with one optimal paths with this value for each value in the Pareto front for two criteria in multimodal networks restricted to transit and walking between stations, considering an origin, a destination, and a start time. The two criteria considered are: Min arrival time (i.e. the earliest arrival time considering the start time); and Min transfer number (i.e. the minimum number of connections, in other words the changes of public transport mode, either within the same network—for instance from a subway line to another—and/or intermodally).

An earliest arrival time query consists in a breadth-first search like exploration in a time-independent graph where the trips are vertices and the feasible transfers the arcs (i.e. which explores all of the neighbor trips on the graph at the present depth prior to moving on to the trips at the next depth level). So, for each iteration, one additional trip is taken in each solution to try and get to a destination.

The TB algorithm is based on the preprocessing and pruning of the feasible transfers between trips. The aim is to build for each trip a neighborhood of reachable trips in such way that for any optimal path, the set of preprocessed neighbors will contain the transition between one trip and its neighbor in the optimal path.

Indeed, although the resulting method would be correct, it is not advisable to use the complete set of feasible transfers between trips during the search phase, as it would be large and the useless arcs will impact the exploration time.

In fact, if all the feasible transfers between one trip and a different line (totally ordered set of trips with the same stop sequence) are considered, only the earliest trip (minimum trip regarding the line order) will be relevant for the above defined Pareto queries.

Thus, it is desirable to prune the set of feasible transfers while keeping enough transfers to compute the Pareto front and possibly one optimal path with this value for each value in the Pareto front.

As explained, the current TB algorithm is restricted to transit and walking between stations, and does not allow combination with non-scheduled modes of transportations such as bike or car-sharing.

However, mixed itineraries, using at the same time scheduled and non-scheduled transportation modes, can prove very efficient. For example, using on-demand buses to reach a train station is very efficient in rural area.

In the example of bike sharing, it has been proposed for example in the document Luis Ulloa, Vassilissa Lehoux-Lebacque, and Frédéric Roulland. *Trip planning within a multimodal urban mobility. IET Intelligent Transport Systems*, 12(2):8792, 2018. to have, either bike-sharing not combined with other modes, at the beginning or the end of a multimodal itinerary, or part of a transfer composed of the mode sequence walking, biking, walking. In this sequence, there is usually no penalty associated with taking the bicycle, while most people will consider as inconvenient the process of going to a station, taking the bicycle, deposing it back to a station and walking back to the network. It would thus be preferable to consider the bicycle part as a trip, as far as convenience of the itinerary is concerned, and the walking parts as the transfer parts, and more generally to enable a trip using a non-scheduled transportation mode at any part of the itinerary.

Therefore, it is desirable to provide a method for computing relevant and diverse itineraries having indifferently scheduled lines and non-scheduled lines of transportation within a multi-modal network.

BRIEF DESCRIPTION OF THE DRAWINGS

The drawings are only for purposes of illustrating various embodiments and are not to be construed as limiting, wherein:

FIG. 4 illustrates an initialization phase for an earliest arrival query algorithm;

FIG. 5 illustrates procedures for adding a trip from a scheduled line or a non-scheduled line to a queue as a candidate trip; and FIGS. 6 and 7 illustrate an earliest arrival query algorithm.

DETAILED DESCRIPTION OF THE DRAWING

Figure 1:
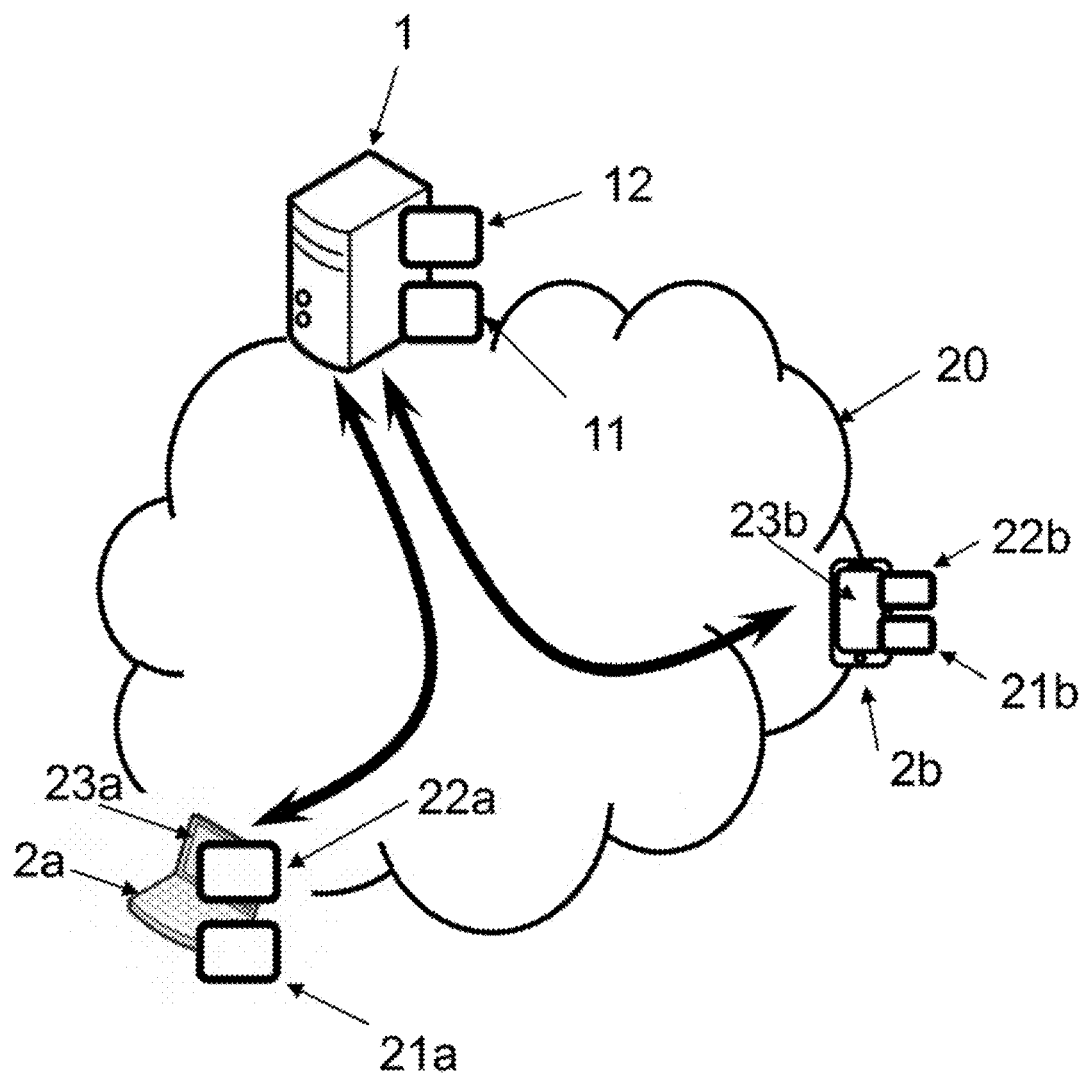
FIG. 1 illustrates an example of architecture in which the methods, described below, are performed.

The method, as will be described in more detail below, preprocesses a set of lines without a schedule within a multimodal transportation network of predetermined stations (and possibly scheduled lines in a known fashion), and a method for computing at least one itinerary from a departure location to an arrival location, able to use these lines without a schedule.

It is noted that the set of transfers is correct (i.e. for any input, and for any optimal value corresponding to this input, the set of transfers contains all transfers that are part of one optimal solution with this value).

The multimodal transportation network is preferably a network of public transportation modes, in particular "scheduled" transportation modes, i.e. following a line (a predetermined sequence of stations) and of which timetables are known. Examples of scheduled public transportation modes include bus, metro, tramway, train, water shuttle, carpooling, etc.

It is noted that in alternate embodiments, the multimodal transportation network might comprise a network of scheduled private transportation modes, which includes airplane, van shuttle, ship, ferry, etc., alone and/or in combination with a network of public transportation modes.

It is further noted that the multimodal transportation network might further comprise non-scheduled transportation modes such as on-demand bus, ride-hailing, or even bike sharing (wherein the users can simply take a bike for going from a station to another without any restriction) alone or in combination with public and private scheduled transportations modes, but for the purpose of the descriptions provided below only scheduled public transportation modes are involved in the multimodal transportation network. It is noted that a plurality of transportation modes is involved, i.e. at least two of them.

By "station", and/or "stop," it is meant a facility at a given location wherein at least one of the transportation modes of the multimodal transportation network regularly stops to load or unload passengers, for example a bus station, a metro station, a train station, a transportation hub (e.g., that includes a bus and train station) etc.

A "displacement" within the multimodal transport network is defined as a sequence of trips each from a station of the multimodal transportation network to another that may or may not involve changing transportation modes between stations.

Mathematically, a "line" (scheduled or not) can be defined as a totally ordered set of trips with the same sequence of stations.

By "trip," it is meant a displacement using a single one of the transportation modes, such as a bus trip or bike trip; i.e., following a line. Generally, any displacement comprises, between two successive trips, a transfer (i.e., it can be seen as an alternation of trips and transfers).

By "transfer," it is meant a connection from a transportation mode to another, for example a displacement between the station at which a trip terminates and the station at which a new trip initiates.

Such transfer is performed according to a "first transportation mode," which is none of the public transportation modes of the network, generally walking, but also possibly using portable or wearable assists, such as kick scooter or skate. The first transportation mode is a non-scheduled and station-free mode, which is freely usable by the user without any limitation.

Typically, the first transportation mode is universal and does not require any vehicle (or at worst a "light" and transportable one such as a skate). It is noted that a transfer does not necessarily involve a displacement (a station can be common to two trips, possibly of the same transportation mode, for example two subways lines).

For the purpose of the following description, the first transportation mode will be assumed to be walking, i.e. any displacement within the network is restricted to transit and walking between stations.

When an itinerary has to be computed within the network, the itinerary comprises successively: (1) a beginning part from the departure location to an initial station of the multimodal transportation network of predetermined stations; (2) a main part in the multimodal transportation network, (defined as an alternation of trips using a transportation mode of said multimodal transportation network, and of transfers using the first mode of transportation); and (3) an end part from a final station of the multimodal transportation network to the arrival location.

In description below, the trips t, u before and after a transfer will be respectively called "origin" trip and "target" trip, so as to distinguish them. In other words, the user transfers from an origin trip t to a target trip u. Note that a target trip may be the origin trip for a further transfer.

Such transfer is performed according to a "first transportation mode," which is none of the public transportation modes of the network, generally walking, but also possibly using portable or wearable assists, such as kick scooter and/or skate.

The departure and arrival locations are geographical locations, typically locations on a map as defined by an address, a point of interest, a station, coordinates, etc.

The beginning part and end part of the itinerary allow to "connect" the user to stations of the network. They could be "null" in particular if the departure/arrival location is an isolated station: then this station could be used as the initial/final station. Nevertheless, even in such case the user has the possibility to walk to another station.

The main part starts with an initial trip from an initial station which is the entry point of the multimodal transportation network for the present itinerary (the wording "source stop" can be found), and ends with a final trip on a target line up to a station which is the exit point of the multimodal transportation network (the wording "target stop" can be found).

The itineraries are preferably the optimal ones (or at least close to the optimal ones, i.e. approximations of the optimal ones) according to at least one criterion (e.g., an optimal itinerary may satisfy at least one criterion) such as the arrival time (which should be the earlier), the duration of the itinerary (which should be the lowest), the departure time (which should be the latest), the length of the itinerary (which should be the shortest), the number of transfers (which should be the lowest), the price (which should be the lowest), etc.

In the example of the Trip-Based Public Transit Routing Algorithm that is detailed in the following description, two criteria are co-considered: arrival time and transfer number.

The beginning part and end part are performed according to the first transportation mode (i.e. walking) or possibly alternatively according to a second transportation mode, which could be any non-scheduled and station-free mode with a longer range than the first transportation mode (and still not one of the modes of said multimodal transportation network).

The second transportation mode is typically taxi, but could be any equivalent transportation mode, in particular any private vehicle ride, such as a car ride (typically lift by a friend, park-and-ride, ride-hailing, etc.), a motorcycle ride, or even a helicopter ride.

An example of a second transportation mode is disclosed in U.S. patent application Ser. No. 16/700,096, filed on Dec. 2, 2019 and entitled "METHOD FOR COMPUTING AT LEAST ONE ITINERARY FROM A DEPARTURE LOCATION TO AN ARRIVAL." The entire content of U.S. patent application Ser. No. 16/700,096 is hereby incorporated by reference.

It is to be understood that both the first and/or second transportation modes are only restricted by the cartography, i.e. the existence of ways (in particular roads), accesses, etc. and are considered to be able to reach any location, by contrast with the modes of the multimodal transportation network which rely on a predetermined list of stations.

To sum up, any considered itinerary starts with a beginning part bringing the user from the departure location to an initial station, then the user travels in a main part into the network using various scheduled public transportation modes and non-scheduled modes (the multimodal transportation network) and walking (the first transportation mode) for transfers, up to a final station, for finishing the itinerary with the end part bringing the user from the final station to the arrival location.

The above-mentioned methods are implemented within an architecture such as illustrated in FIG. 1, by means of a server 1, a mobile computer 2a, or mobile phone 2b.

Each of these devices is typically connected to an extended network 20 such as the Internet for data exchange. Each device comprises data processing means (11, 21a, and 21b) such as a processor, and storage means (12, 22a, and 22b) such as a computer memory; e.g., a hard disk.

More specifically, the server 1 performs the preprocessing of the set of transfers, and the user generally owns a mobile phone 2b such as a smartphone, for inputting a request for itineraries (are inputted the departure location, the arrival location, and a departure time). The request for itineraries may be either directly processed by the mobile phone 2b, or transmitted to the server 1 for processing there. The present methods will not be limited to any specific implementation.

Figure 2:
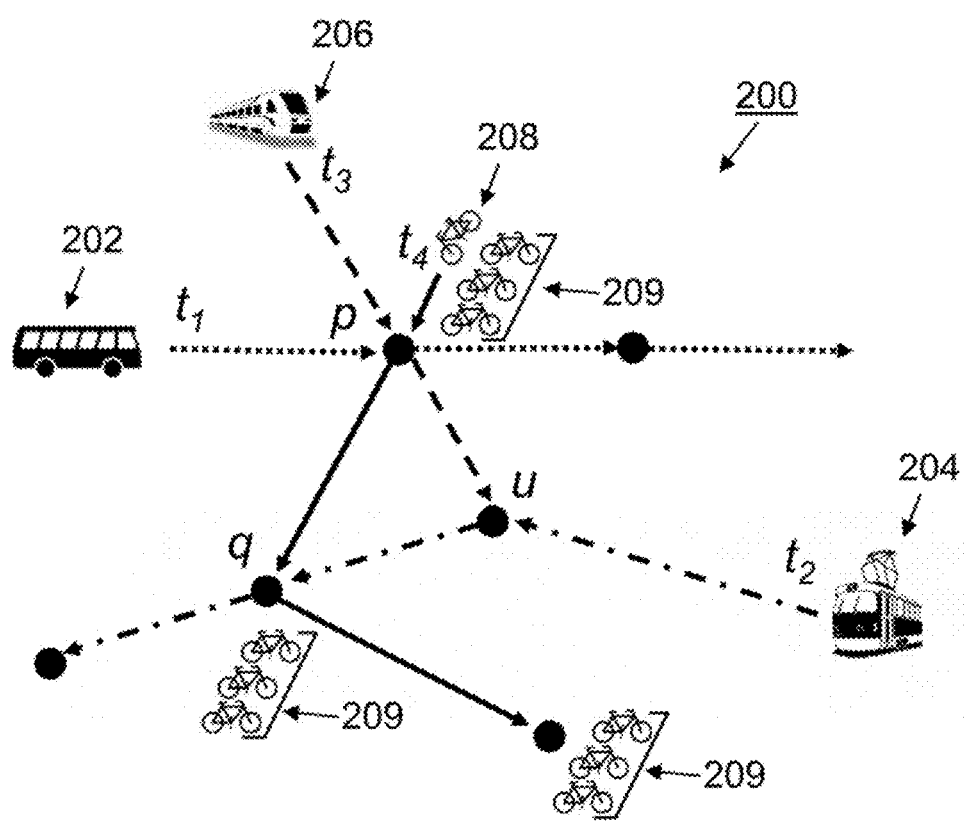
FIG. 2 illustrates an example of configurations of trips and transfers.

FIG. 2 illustrates an example multimodal transportation network 200 with three scheduled lines; namely, bus line 202, tram line 204, and metro line 206, each representing a different mode of transportation in the multimodal transportation network 200, and each line having the possibility of trips $t_1$, $t_2$, and $t_3$, respectively. In addition, the multimodal transportation network 200 includes non-scheduled bike-sharing line 208, with bike sharing stations 209, and having the possibility of trip $t_4$.

When looking into transfers from trip $t_1$ to trip $t_2$, it is possible to transfer to trip $t_3$ (using metro line 206) or to trip $t_4$ (using bike-sharing line 208) at station p then transfer to trip $t_2$ at station u (when using metro line 206) or station p (when using bike-sharing line 208).

Accordingly, a user may thus want to know of the possibility of transferring from trip $t_1$ to trip $t_2$ by way of trip $t_4$ instead of trip $t_3$ depending on the departure window (i.e., the time interval during which a trip on the non-scheduled line can depart from).

Figure 3:
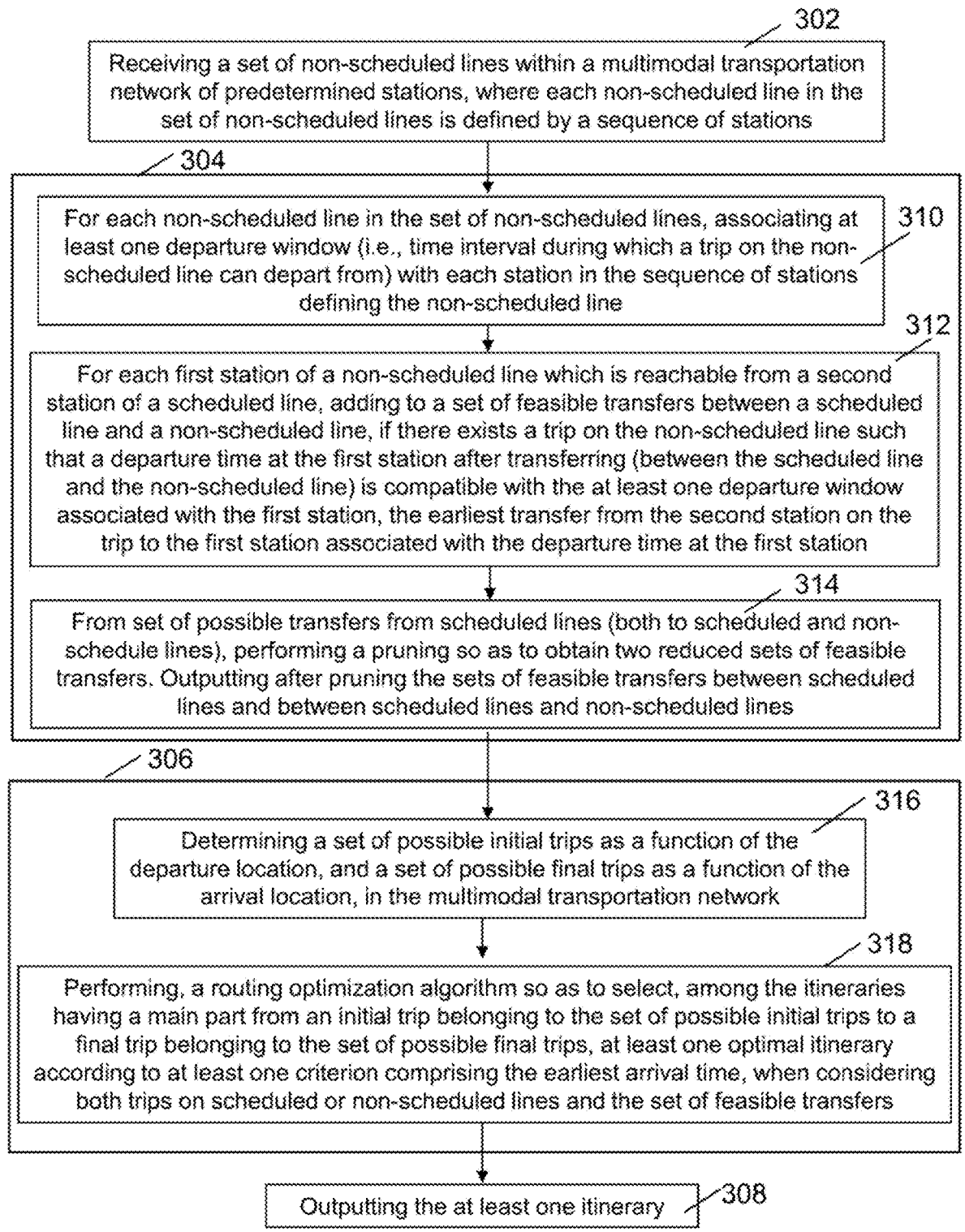
FIG. 3 illustrates a method for preprocessing a set of non-scheduled lines within a multimodal transportation network of predetermined stations and for computing at least one itinerary.

FIG. 3 illustrates a method for preprocessing, at step 304, a set of non-scheduled lines within a multimodal transportation network of predetermined stations received at step 302 and for computing, at step 306, at least one itinerary for output at 308.

In one embodiment, the itinerary output at step 308 includes trips on non-scheduled lines and scheduled lines of transportation (e.g., as shown in FIG. 2, transferring from trip $t_1$ to trip $t_2$, on scheduled lines of transportation, by way of trip $t_4$, on a non-scheduled line of transportation via stations p and q).

Considering a set T of all the feasible transfers between scheduled lines, the aim of the preprocessing is, as previously explained, to prune this set T so as to output a subset T' in order to highly reduce the exploration time when computing an itinerary on this basis, while granting optimal results to queries (computation of the Pareto front and of one optimal path with this value for each value in the Pareto front). It is noted that the set of trips is not modified, so that the preprocessing corresponds to a simplification of the graph so as to remove arcs (transfers) between vertices (trips).

As previously explained, the preprocessing, at step 304, also proposes to integrate, at steps 310 and 312, non-scheduled lines by generating a further set $\hat{T}$ of the feasible transfers from scheduled lines to non-scheduled lines (i.e. without a schedule).

It is noted that the preprocessing, at step 314, may comprise further pruning of this set of feasible transfers between scheduled lines and non-scheduled lines. For non-scheduled lines where stopping at all the stations of the lines is needed, the same pruning based on the arrival times at the reached stations as the one of the scheduled lines can be performed, at step 314.

The idea is that once the earliest trip has been identified (see below), earliest arrival time at all reachable stations can be updated as for regular scheduled trips. As a consequence, for more efficiency of the pruning, pruning of the sets of transfers, from trip of scheduled lines to trip of scheduled lines and from trips of scheduled lines to trips of non-scheduled lines, are performed in a single step for each origin trip from a scheduled line.

All the lines of a set $\hat{L}$ of the non-scheduled lines are defined by a sequence of stations $\vec{p}(l)=(p_l^1, p_l^2, \ldots)$ (as the regular lines). Furthermore, for each non-scheduled line of the set of non-scheduled lines, for each station of the sequence of stations defining the line, a time interval during which a trip can depart from the station (forming a set of time intervals during which the line is available) is associated to the station, at step 310. The union of the time intervals of the line l at its $i^{th}$ station $p_l^i$ is denoted by I(l, i).

A possible way to define those time intervals is to define one for the first station $p_l^1$ and then translate it to the other stations of the line by the duration to reach them. It can be the case for on-demand buses if the bus will pass by all the stations when activated.

Another possibility is to use the same time interval for all stations. It can be the case for non-scheduled lines defined for bike sharing stations or for taxi-like transportation between two points where the time-intervals represent the service availability period, for instance from 9 am to 6 pm.

Note that it is possible to consider several time intervals per line and station, for example a service that would be available from 8 am to 12 pm and then from 2 pm to 5 pm. In that case, I(l, i) is a union of intervals.

To manipulate non-scheduled lines in the same way as scheduled lines, the preprocessing method proposes to simulate a schedule so as to be able to define any trip of line l that departs at a station $p_l^i$ at a given time $\tau \in I(l, i)$.

It is noted that for a regular scheduled line, a set of trips is given, and thus the schedule is a predetermined timetable of, for each trip t of the line, the corresponding departure time $\tau_{dep}(t, i)$ and/or arrival time $\tau_{arr}(t, i)$ at each $i^{th}$ station $p_t^i$ on the trip t.

Thus, it might not be conventional to speak of schedules for a non-scheduled line, wherein a trip may occur anytime, but what is intended here is simply to be able to express the departure/arrival times at each station for a given trip to be defined, and not to constitute a timetable.

More specifically, the schedule is function of the time $\tau$ at which a trip departs from the station $p_l^i$. In some settings, this station might be the first station of the line (i.e. i=0), wherever the trip has been required, or in other settings, it might be the first station at which the line has been activated.

In a first embodiment, a schedule may be simulated by determining a travel time (possibly time-dependent), between the consecutive stations in $\vec{p}(l)$. Depending of the type of line considered, for example if the line, once activated, will actually pass by all the stations, this first solution might be more appropriate (as it needs less memory).

In a second embodiment, a schedule may be simulated by defining a travel time, possibly different for each line l and still possibly time-dependent, this time between any pair of stations (p, q) of the line l such that $p=p_l^i$ and $q=p_l^j$ with i<j. This solution is more general and covers the first one. It can be used to model transportation modes such as bike-sharing wherein the user generally does not pass by intermediate stations but just move between two stations. In that case, a line can be defined for each bike sharing station, starting at this station, and then passing by all the other reachable bike sharing stations, preferably in increasing travel time with said reachable station order. By reachable, it is meant that the station is within a maximum travel time/distance from of the line and that a bike taken at the first station of the line can be left at this station. The other possibility is to create a line for any pair of stations i and j such that j is reachable from i.

For a trip starting at $\tau \in I(l, i)$ at the $i^{th}$ station of non-scheduled line l, the following schedule for the $j^{th}$ station (with j>i) can be used: (1) the arrival time at the $j^{th}$ station $p_l^j$ is expressed as a function of $\tau$ by the formula $\tau_{arr}(l, i, \tau, j) = \tau + \Delta\tau(p_l^i \to p_l^j, \tau)$, wherein $\Delta\tau(p_l^i \to p_l^j, \tau)$ is the duration, when taking a trip of l, for going from the $i^{th}$ station $p_l^i$ to the $j^{th}$ station $p_l^j$ of the line l leaving at time $\tau$ from station $p_l^i$; and (2) the departure time at the $j^{th}$ station $p_l^j$ is expressed as a function of $\tau$ by the formula $\tau_{dep}(l, i, \tau, j) = \tau_{arr}(l, i, \tau, j) + \Delta\tau_d(l, j, \tau_{arr}(l, i, \tau, j))$, wherein $\Delta\tau_d(l, j, \tau')$ is some optional delay between arrival and departure at time $\tau'$ at station $p_l^j$ (note that it may not necessarily depend from the time and/or from the station).

The trip respecting such schedule is the earliest trip of line l starting after time $\tau$, that is hereby denoted earliest(l, i, $\tau$). In the case where $\tau$ doesn't belong to I(l, i), we can also define earliest(l, i, $\tau$) by activating the trip at the first instant $\tau'$ of I(l, i) such that $\tau' \geq \tau$ if this instant exists. In that case, there is a waiting time of $\tau' - \tau$ at station $p_l^i$. In an embodiment, a maximum value w is preferably set for this waiting time, and in that case, earliest(l, i, $\tau$) will only be defined if $\tau' - \tau \leq w$. It is noted that this bound could also be applied to the waiting time of transfers between schedule lines, which would prune the set of transfers between scheduled lines. It is noted that other waiting times might be considered and bounded.

In some cases, a boarding or alighting duration might be considered for the lines of L. For example, if the line is a bike sharing ride, an additional duration might be needed to get the bicycle from the station or to put it back in place. We denote by $\tau_{bo}(l)$ the duration necessary for boarding the line and $\tau_{al}(l)$ the duration necessary for alighting.

It is to be noted that those boarding/alighting times could be also defined for regular schedule lines (for example time to get at the right place in the train or to get off with the luggage), so they may be considered for all lines. In an implementation, those values can also be defined by mode type instead of individual values for all lines.

Further, at step 312, a set $\hat{T}$ of feasible transfers between a scheduled line and a non-scheduled line is generated. It is noted that this step may comprise the generation of the set T of feasible transfers between scheduled lines in a known fashion.

The transfers, at step 312, concern transfers from one trip to another; i.e., performing the following actions: getting off the first trip at a given first station, then reaching a second station on another trip by either walking or waiting and then boarding this other trip.

When lines are scheduled, the computation is straightforward: for each station $p_t^i$ of the current trip t, all the stations q that can be reached by walking (i.e. a transfer duration $\Delta\tau_{fp}(p_t^i, q)$ exists, i.e. is defined) are identified, and it is checked whether a transfer can take place, in other words whether there is a trip t' of a non-scheduled line l having q as its $j^{th}$ station. This is the case when $\tau_{arr}(i, t) + \Delta\tau_{fp}(p_t^i, p_{t'}^j) \leq \tau_{dep}(j, t')$. It is noted that a boarding time $\tau_{bo}(l_{t'})$ and/or an alighting time $\tau_{al}(l_t)$ can be considered as explained.

In that case, only the earliest such a trip is added as a possible transfer, since taking another cannot yield to better solutions for the criteria arrival time or number of transfers.

It is possible to proceed in a similar way for defining admissible transfers to trips of non-scheduled lines from trips of schedule lines. More specifically, step 312 comprises, for each first station $(p_l^j)$ of a non-scheduled line which is reachable from a second station of a scheduled line $(p_t^i)$, adding to the set of feasible transfers between a scheduled line and a non-scheduled line, if there exists a trip on the non-scheduled line such that a departure time at said first station after transferring is compatible with the union of time intervals (I(l, j)) associated to the first station $(p_l^j)$, the earliest transfer from said second station on said trip to the first station. By compatible, it is meant that earliest(l, i, $\tau_{arr}(i, t) + \Delta\tau_{fp}(p_t^i, p_l^j)$) is defined. The corresponding transfer to be added can be noted $(p_t^i \to p_l^j, \tau)$ with $\tau = \tau_{dep}(j, t')$ the departure time of the above defined earliest trip t' of l. In all equations, again a boarding time $\tau_{bo}(l_{t'})$ and/or an alighting time $\tau_{al}(l_t)$ can be considered.

In the case of non-scheduled lines, trips can start at any moment in the time interval at any station. Although this interval could be discretized and all the possible trips generated (for example creating one trip every 10 seconds), this solution would greatly increase the number of trips as the number of possible transfers.

So it would not be advisable to generate all the possible non-scheduled trips and to consider all their admissible transfers for preprocessing.

Nonetheless, as explained some transfers may be pruned to make the search faster.

For non-scheduled lines, it is also possible to compute the feasibility at some point in the interval of transfers from one line to another depending on the availability of both lines. Being in a context of urban mobility, the intervals will certainly be wide (typically from 9.00 am to 5.00 pm) and hence the lines' intervals are likely to be compatible.

Alternatively, all the transfers to non-scheduled lines could be considered during the query phase without pruning them (i.e. without defining trips on the reached non-schedules lines).

According to a second aspect, a method computes at least one itinerary from a departure location to an arrival location.

As already explained, each itinerary comprising a main part in a multimodal transportation network of predetermined stations, defined as a sequence of trips from a set of possible trips within the multimodal transportation network and transfers from a set of feasible transfers within the multimodal transportation network.

What is particular is that the itinerary may comprise a combination of trips using scheduled or non-scheduled transportation modes. It is noted that it is still possible that the computed itinerary only comprises trips on schedules lines if it is optimal (for instance, a subway will often be faster and possibly as convenient as bike-sharing, and if the subway stations are rightly placed there will be no need for bike-sharing). Nevertheless, the method allows non-scheduled transportations.

The method for computing an itinerary, as illustrated in FIG. 3, starts with steps 302 and 304, implemented by the data processor 11 of the server 1, to preprocess the set of non-scheduled lines within the multimodal transportation network according to the first aspect, so as to obtain a set of transfers between scheduled lines and non-scheduled lines. In other words, step 306 receives as input, from step 304, a set of all feasible transfers that comprises both transfers between scheduled lines and transfers between scheduled lines and non-scheduled lines. It is noted that, as already explained, the processing may comprise pruning transfers between scheduled lines and/or transfers between scheduled lines and non-scheduled lines.

As already explained, the TB algorithm (or any other suitable routing algorithm) starts with an initialization phase, at step 316, where the set of lines L from which the destination can be reached and the set of the earliest trips that can be reached from the origin are computed.

In other words, at step 316, performed by the data processor 11 of the server 1 or a data processor 21b of the client device 2b, a set of possible initial trips is determined as a function of the departure location, and a set of possible final trips is determined as a function of the arrival location, in said multimodal transportation network. The set of possible final trips can be represented as all the trips belonging to a set of possible target lines as it is the case in the TB algorithm.

The initialization phase can be performed in any known way, but it is to be noted that the lines without schedule can be scanned as the regular lines for determining the targets trips or lines from the arrival location. As explained, all possible trips could have been generated on the non-scheduled lines, but preferably, the trips are either generated during the preprocessing phase (for the neighbors of the scheduled lines) or on-the-fly during the search query.

During the initialization phase, the origin trips from non-scheduled lines can be generated as a function of the departure location of the itinerary. The target trips of lines without a schedule are preferably represented by a target line set, to avoid generating many possible trips from those target lines. An initialization method is set forth in procedure INITIALIZATION 402 shown in FIG. 4, which includes calls to ENQUEUE_TRIP 502 and ENQUEUE_LINE 504 shown in FIG. 5.

In the known TB algorithm, for each number of transfers is defined a n-th queue $Q_n$ of trip segments reached after n transfers.

The 0-th queue $Q_0$ is normally initialized with trips that can be directly reached from the departure location (that is why the procedure INITIALIZATION 402 shown in FIG. 4 presents calls of a procedure ENQUEUE_TRIPS 502 shown in FIG. 5 having the third argument equal to 0), and all the others queues $Q_1$, $Q_2$, etc. are initially empty.

At each iteration, the procedure Earliest arrival query 602 shown in FIG. 6 scans the trips in the current queue. Each trip is scanned in turn. If the trip belongs to the target lines (i.e. constitutes a final trip), it is compared to the current solution set at 604. Then, the transfers from this trip are added to the queue of the next iteration at 608.

FIG. 5 illustrates procedure 500 for adding trips from scheduled and non-scheduled lines. In procedure ENQUEUE_LINE 504, shown in FIG. 5 (which calls procedure UPDATE-R 506 shown in FIG. 5), the availability intervals and the minimum boarding duration are advantageously considered to propose the earliest schedule for that line, i.e. to generate and add to the queue the earliest trip.

For trips of scheduled lines, an index R(t) of the first reached station of trip t, i.e. the "point of entry", is typically used (see procedure ENQUEUE_TRIP 502, as shown in FIG. 5). For non-scheduled lines, this index R(t) is preferably duplicated into another index $\hat{R}(l)$ in such way that $\hat{R}(l)$ contains a set of pairs (i, τ) with the index of the station and a departure time of the trip at that station. In other words, each first reached station is associated to the corresponding departure time needed to define a trip of the non-scheduled line l.

The set $\hat{R}(l)$ is for making the search efficient: trips that are later than the one already taken are not inserted again in the queue.

This set $\hat{R}(l)$ implies an update procedure such that an element (i, τ) of $\hat{R}(l)$ is not "dominated" by any other element of $\hat{R}(l)$. By dominated, it is meant that the other element defines a trip with at least one of an earlier "entry point" on the line and an earlier earliest departure time, while the other element's "entry point" is at least as early as that of the element and its earliest departure time is at least as early as that of the element, so that there is no point in keeping said "dominated" element. In other words a pair (i, τ) is dominated by another pair (j, τ') if and only if i≥j∧τ>$\tau_{dep}$(earliest(l, j, τ'), i), as τ=$\tau_{dep}$(earliest(l, i, τ), i).

Hence, the maximum number of elements of the set $\hat{R}(l)$ is $|\vec{p}(l)|$. A simple way to maintain the elements of $\hat{R}(l)$ is then to save for each station j of line l the earliest departure time of a trip of l at that station during the search. $\hat{R}(l)$ may then be considered as an array of length $|\vec{p}(l)|$, whose values being the earliest departure times at each station of the line in a trip of line l reached during the search. $\vec{R}(l, j)$ could thus denote the earliest departure time of l at its $j^{th}$ station in the current search.

It is noted that since profile queries are an adaptation of earliest arrival time queries, it is possible to take them into account as already known even after the modifications.

At step 318 in FIG. 3, the suitable known routing optimization algorithm such a modified TB can be performed to produce at least one itinerary at step 318 based on the sets of initial trips and final lines, and the set of feasible transfers between scheduled lines and non-scheduled lines (the set of feasible transfers between scheduled lines is naturally still used) for instance as illustrated by the algorithm 602 in FIG. 6 (which includes a call to procedure INITIALIZATION 402 in FIG. 4), where the detail step 608 of step 606 is shown in FIG. 7 (which includes calls to ENQUEUE_TRIP 502 and ENQUEUE_LINE 504 in FIG. 5).

For each iteration, one additional trip is taken in each solution to try and get to a final trip as shown in FIG. 6, at step 602, where an additional transfer is added from the queue. If the trip added is from a non-scheduled line, transfers to scheduled and non-scheduled lines from this trip are computed at step 700 in FIG. 7. If the added trip is from a scheduled line, its transfers have been precomputed, at step 304 in FIG. 3, and can directly be added to the queue, at step 702 in FIG. 7, using procedures ENQUEUE_TRIP 502 and ENQUEUE_LINE 504 in FIG. 5.

It can be seen that when considering a transfer between a scheduled line and a non-scheduled line, at step 608 in FIG. 7, the procedure ENQUEUE_LINE 504 in FIG. 5 is preferably again used so to as to generate a trip on the reached non-scheduled line and add the transfers from this trip to the queue of the next iteration.

In an alternate embodiment, the preprocessed set of non-scheduled lines may be used for constructing availability time windows for non-schedule lines (e.g., for on-demand bus lines). Advantageously, such time windows constructed, using a set of scheduled lines to transfer from, may be organized for the non-scheduled line to be available only on periods where transfers to non-schedule lines from schedule lines are in the set of precomputed transfers or to avoid long waiting times between trips (e.g., when the service is not available for a long period after transferring to the station from the scheduled line of transportation), and evaluated for robustness in the event of delays so that missed transfers may be minimized (e.g. when the service close just before arrival at the station after transferring from the scheduled line of transportation).

In another embodiment, the preprocessed set of non-scheduled lines may be used for managing transportation network resources (e.g., to assist in deciding whether additional vehicles are required when a line is delayed).

In yet another embodiment, the preprocessed set of transfers from scheduled lines to non-scheduled lines could be used in determining the placement of the stations along scheduled lines and non-scheduled lines, in order to maximize one or several criteria such as but not limited to usefulness of the on-demand services (transfers to the non-schedule line must be in the set to possibly appear in any optimal itinerary).

A method for preprocessing a set of non-scheduled lines within a multimodal transportation network of predetermined stations, the method (a) for each non-scheduled line (l) of the set of non-scheduled lines, associates, to each station $(p_l^j)$ of a sequence of stations $(\vec{p}(l))$ defining the non-scheduled line (l), at least one time interval $(I(l, j))$ during which a trip on the non-scheduled line (l) can depart from the station $(p_l^j)$; (b) for each first station $(p_l^j)$ of a non-scheduled line (l) which is reachable from a second station $(p_t^i)$ of a scheduled line, adds to a set of feasible transfers between a scheduled line and a non-scheduled line, if there exists a trip (t) on the scheduled line such that a departure time at the first station $(p_l^j)$ after transferring is compatible with the at least one time interval $(I(l, j))$ associated to the first station $(p_l^j)$, the earliest transfer from the second station $(p_t^i)$ on the trip (t) to the first station $(p_l^j)$; and (c) outputs the set of feasible transfers between a scheduled line and a non-scheduled line for computing at least one itinerary in the multimodal transportation network.

The addition of a set of feasible transfers between a scheduled line and a non-scheduled line includes generating a set of feasible transfers between scheduled lines, and pruning this set so as to obtain a reduced set of feasible transfers between scheduled lines.

A departure time at the first station $p_l^j$ after transferring is considered to be compatible with the at least one time interval $(I(l, j))$ if there exists a instant $\tau \in I(l, j)$ such that the inequality $\tau_{arr}(i, t) + \Delta\tau_{fp}(p_t^i, p_l^j) \leq \tau$ is verified, wherein $\tau_{arr}(i, t)$ is the arrival time at the second station $p_t^i$ on trip t, $\Delta\tau_{fp}(p_t^i, p_l^j)$ is the transfer duration from the second station $p_t^i$ on trip t to the first station $p_l^j$.

The earliest transfer from the second station $p_t^i$ on the trip t to the first station $p_l^j$ is the transfer to the first station $p_l^j$ on the earliest trip t' of the non-scheduled line l which is the earliest instant $\tau \in I(l, j)$ such that $\tau \geq \tau_{arr}(i, t) + \Delta\tau_{fp}(p_t^i, p_l^j)$.

For a transfer between trip t at index i and trip t' at index j to be valid, the waiting time associated with the transfer is bounded by a maximum value w, i.e. $\tau_{dep}(j, t') - (\tau_{arr}(i, t) + \Delta\tau_{fp}(p_t^i, p_l^j)) \leq w$.

A boarding time $(\tau_{bo}(l_t))$ and/or an alighting time $(\tau_{al}(l_t))$ are added respectively before the departure from the first station $(p_l^j)$ and/or after the arrival at the second station $(p_t^i)$.

The association routine includes defining a travel time between any pair of stations (p, q) of the non-scheduled line l such that $p = p_t^i$ and $q = p_l^j$ with $i < j$.

The method further (d) performs a routing optimization algorithm so as to select, among the itineraries having a main part from an initial trip belonging to the set of possible initial trips to a final trip belonging to the set of possible final trips, at least one optimal itinerary according to at least one criterion including the earliest arrival time, when considering both trips on scheduled or non-scheduled lines and transfers between trips from the set of feasible transfer.

The routing optimization algorithm computes the Pareto front, possibly along with at least one optimal path with this value for each value in the Pareto front, for the earliest arrival time and number of transfers or latest departure time and number of transfers in multimodal networks by taking one additional trip, for each iteration, based on the precomputed set of feasible transfers.

The method further, when considering transfer to a non-scheduled line at a station, proposes as a candidate trip the earliest compatible trip on the non-scheduled line from the station.

The method further builds, for the non-scheduled line, a set $(\hat{R}(l))$ of pairs of an index of a station on the non-scheduled line and the earliest departure time of a trip from that station.

A method for computing at least one itinerary from a departure location to an arrival location, each itinerary comprising a main part in a multimodal transportation network of predetermined stations, defined as a sequence of trips on scheduled or non-scheduled lines within the multimodal transportation network and transfers from a set of feasible transfers within the multimodal transportation network, the method (a) preprocesses the set of non-scheduled lines to obtain the set of feasible transfers between scheduled lines and non-scheduled lines; (b) determines a set of possible initial trips as a function of the departure location, and a set of possible final trips as a function of the arrival location, in the multimodal transportation network; and (c) performs a routing optimization algorithm so as to build, among the itineraries having a main part from an initial trip belonging to the set of possible initial trips to a final trip belonging to the set of possible final trips, at least one optimal itinerary according to at least one criterion including the earliest arrival time, when considering both trips on scheduled or non-scheduled lines and transfers between trips from the set of feasible transfer.

The routing optimization algorithm computes the Pareto front, possibly along with at least one optimal path with this value for each value in the Pareto front for the earliest arrival time and number of transfers or latest departure time and number of transfers in multimodal networks by taking one additional trip, for each iteration, based on the precomputed set of feasible transfers.

The method further, when considering transfer to a non-scheduled line at a station, proposes as a candidate trip the earliest compatible trip on the non-scheduled line from the station.

The method further builds, for the non-scheduled line, a set ($\hat{R}(l)$) of pairs of an index of a station on the non-scheduled line and the earliest departure time of a trip from that station.

A computer program product for preprocessing a set of non-scheduled lines within a multimodal transportation network of predetermined stations, the computer program product being executed on a computer to perform a process, the process (a) for each non-scheduled line (l) of the set of non-scheduled lines, associates, to each station ($p_j^j$) of a sequence of stations ($\vec{p}(l)$) defining the non-scheduled line (l), at least one time interval (I(l, j)) during which a trip on the non-scheduled line (l) can depart from the station ($p_j^j$); (b) for each first station ($p_j^j$) of a non-scheduled line (l) which is reachable from a second station ($p_t^i$) of a scheduled line, adds to a set of feasible transfers between a scheduled line and a non-scheduled line, if there exists a trip (t) on the scheduled line such that a departure time at the first station ($p_j^j$) after transferring is compatible with the at least one time interval (I(l, j)) associated to the first station ($p_j^j$), the earliest transfer from the second station ($p_t^i$) on the trip (t) to the first station ($p_j^j$); and (c) outputs the set of feasible transfers between a scheduled line and a non-scheduled line for computing at least one itinerary in the multimodal transportation network.

The addition of a set of feasible transfers between a scheduled line and a non-scheduled line includes generating a set of feasible transfers between scheduled lines, and pruning this set so as to obtain a reduced set of feasible transfers between scheduled lines.

A departure time at the first station $p_j^j$ after transferring is considered to be compatible with the at least one time interval (I(l, j)) if there exists a instant $\tau \in I(l, j)$ such that the inequality $\tau_{arr}(i, t) + \Delta\tau_{fp}(p_t^i, p_j^j) \leq \tau$ is verified, wherein $\tau_{arr}(i, t)$ is the arrival time at the second station $p_t^i$ on trip t, $\Delta\tau_{fp}(p_t^i, p_j^j)$ is the transfer duration from the second station $p_t^i$ on trip t to the first station $p_j^j$.

The earliest transfer from the second station $p_t^i$ on the trip t to the first station $p_j^j$ is the transfer to the first station $p_j^j$ on the earliest trip t' of the non-scheduled line l which is the earliest instant $\tau \in I(l, j)$ such that $\tau \geq \tau_{arr}(i, t) + \Delta\tau_{fp}(p_t^i, p_j^j)$.

For a transfer between trip t at index i and trip t' at index j to be valid, the waiting time associated with the transfer is bounded by a maximum value w, i.e. $\tau_{dep}(j, t') - (\tau_{arr}(i, t) + \Delta\tau_{fp}(p_t^i, p_j^j)) \leq w$.

A boarding time ($\tau_{bo}(l_r)$) and/or an alighting time ($\tau_{al}(l_r)$) are added respectively before the departure from the first station ($p_j^j$) and/or after the arrival at the second station ($p_t^i$).

A travel time between any pair of stations (p, q) of the non-scheduled line l is defined such that $p = p_i^l$ and $q = p_j^l$ with $i < j$.

A routing optimization algorithm is performed so as to select, among the itineraries having a main part from an initial trip belonging to the set of possible initial trips to a final trip belonging to the set of possible final trips, at least one optimal itinerary according to at least one criterion including the earliest arrival time, when considering both trips on scheduled or non-scheduled lines and transfers between trips from the set of feasible transfer.

The routing optimization algorithm computes the Pareto front, possibly along with at least one optimal path with this value for each value in the Pareto front for the earliest arrival time and number of transfers or latest departure time and number of transfers in multimodal networks by taking one additional trip, for each iteration, based on the precomputed set of feasible transfers.

The process further, when considering transfer to a non-scheduled line at a station, proposes the earliest compatible trip on the non-scheduled line from the station as a candidate trip.

For the non-scheduled line, a set ($\hat{R}(l)$) of pairs of an index of a station on the non-scheduled line and the earliest departure time of a trip from that station is built.

The computer program product is a computer-readable medium.

A computer program product for computing at least one itinerary from a departure location to an arrival location, each itinerary comprising a main part in a multimodal transportation network of predetermined stations, defined as a sequence of trips on scheduled or non-scheduled lines within the multimodal transportation network and transfers from a set of feasible transfers within the multimodal transportation network, the computer program product being executed on a computer to perform a process, the process (a) preprocesses the set of non-scheduled lines to obtain the set of feasible transfers between scheduled lines and non-scheduled lines; (b) determines a set of possible initial trips as a function of the departure location, and a set of possible final trips as a function of the arrival location, in the multimodal transportation network; and (c) performs a routing optimization algorithm so as to build, among the itineraries having a main part from an initial trip belonging to the set of possible initial trips to a final trip belonging to the set of possible final trips, at least one optimal itinerary according to at least one criterion including the earliest arrival time, when considering both trips on scheduled or non-scheduled lines and transfers between trips from the set of feasible transfer.

The routing optimization algorithm computes the Pareto front, possibly along with at least one optimal path with this value for each value in the Pareto front for the earliest arrival time and number of transfers or latest departure time and number of transfers in multimodal networks by taking one additional trip, for each iteration, based on the precomputed set of feasible transfers.

When considering transfer to a non-scheduled line at a station, the earliest compatible trip on the non-scheduled line from the station is proposed as a candidate trip.

For the non-scheduled line, a set ($\hat{R}(l)$) of pairs of an index of a station on the non-scheduled line and the earliest departure time of a trip from that station is built.

The computer program product is a computer-readable medium.

It will be appreciated that variations of the above-disclosed embodiments and other features and functions, and/or alternatives thereof, may be desirably combined into many other different systems and/or applications. Also, various presently unforeseen and/or unanticipated alternatives, modifications, variations, and/or improvements therein may be subsequently made by those skilled in the art which are also intended to be encompassed by the description above and the following claims.

What is claimed is:

1. A method for building at least one optimal itinerary for use by a user to plan a trip travelling in a multimodal transportation network according to a number of transfers in the multimodal transportation network by preprocessing a set of non-scheduled lines within a multimodal transportation network of predetermined stations to enable the building of itineraries that combine non-scheduled lines and scheduled lines, a scheduled line being a predetermined sequence of stations with known timetables, a non-scheduled line being a non-walking mode of transportation having no known timetable, the method comprising:

(a) receiving from a user, via a user interface, a departure location and an arrival location;

(b) electronically, for each non-scheduled line (l) of the set of non-scheduled lines, associating, using an electronic processor and electronic memory, to each station ($p_i^j$) of a sequence of stations ($\vec{p}(l)$) defining the non-scheduled line (l), at least one time interval (I(l, j)) during which a trip ($t_n$) on the non-scheduled line (l) can depart from the station ($p_i^j$);

(c) electronically, for each first station ($p_i^j$) of the non-scheduled line (l) which is reachable from a second station ($p_t^i$) of a scheduled line, adding, using an electronic processor and electronic memory, to a set of feasible transfers between a scheduled line and a non-scheduled line, if there exists a trip ($t_s$) on the scheduled line such that a departure time at the first station ($p_i^j$) after transferring is compatible with the at least one time interval (I(l, j)) associated to the first station ($p_i^j$), the earliest transfer from the second station ($p_t^i$) on the trip ($t_s$) to the first station ($p_i^j$);

(d) electronically, outputting, using an electronic processor and electronic memory, the set of feasible transfers between a scheduled line and a non-scheduled line for computing at least one itinerary in the multimodal transportation network;

(e) electronically determining, using an electronic processor and electronic memory, based upon the set of feasible transfers, a set of possible initial trips as a function of the departure location and a set of possible final trips as a function of the arrival location, in a multimodal transportation network;

(f) electronically performing, using an electronic processor and electronic memory, a routing optimization algorithm so as to build, among itineraries having a main part from an initial trip belonging to the set of possible initial trips to a final trip belonging to the set of possible final trips, at least one optimal itinerary according to at least one criterion including an earliest arrival time, based upon trips on scheduled or non-scheduled lines and transfers between trips from the set of feasible transfer; and (g) outputting to the user, via a user interface, the at least one optimal itinerary for use by the user to plan a trip travelling in the multimodal transportation network.

2. The method according to claim 1, wherein (c) includes generating a set of feasible transfers between scheduled lines, and pruning this set so as to obtain a reduced set of feasible transfers between scheduled lines.

3. The method according to claim 1, wherein a departure time at the first station $p_i^j$ after transferring is considered to be compatible with the at least one time interval (I(l, j)) if there exists a instant $\tau \in I(l, j)$ such that the inequality $\tau_{arr}(i, t) + \Delta\tau_{fp}(p_t^i, p_i^j) \leq \tau$ is verified, wherein $\tau_{arr}(l, t)$ is the arrival time at the second station $p_t^i$ on trip t, $\Delta\tau_{fp}(p_t^i, p_i^j)$ is the transfer duration from the second station $p_t^i$ on trip t to the first station $p_i^j$.

4. The method according to claim 2, wherein a departure time at the first station $p_i^j$ after transferring is considered to be compatible with the at least one time interval (I(l, j)) if there exists a instant $\tau \in I(l, j)$ such that the inequality $\tau_{arr}(i, t) + \Delta\tau_{fp}(p_t^i, p_i^j) \leq \tau$ is verified, wherein $\tau_{arr}(l, t)$ is the arrival time at the second station $p_t^i$ on trip t, $\Delta\tau_{fp}(p_t^i, p_i^j)$ is the transfer duration from the second station $p_t^i$ on trip t to the first station $p_i^j$.

5. The method according to claim 3, wherein the earliest transfer from the second station $p_t^i$ on the trip t to the first station $p_i^j$ is the transfer to the first station $p_i^j$ on the earliest trip t' of the non-scheduled line l which is the earliest instant $\tau \in I(l, j)$ such that $\tau \geq \tau_{arr}(i, t) + \Delta\tau_{fp}(p_t^i, p_i^j)$.

6. The method according to claim 4, wherein the earliest transfer from the second station $p_t^i$ on the trip t to the first station $p_i^j$ is the transfer to the first station $p_i^j$ on the earliest trip t' of the non-scheduled line l which is the earliest instant $\tau \in I(l, j)$ such that $\tau \geq \tau_{arr}(i, t) + \Delta\tau_{fp}(p_t^i, p_i^j)$.

7. The method according to claim 1, wherein for a transfer between trip t at index i and trip t' at index j to be valid, the waiting time associated with the transfer is bounded by a maximum value w, i.e. $\tau_{dep}(j, t') - (\tau_{arr}(i, t) + \Delta\tau_{fp}(p_t^i, p_t^j)) \leq w$.

8. The method according to claim 2, wherein for a transfer between trip t at index i and trip t' at index j to be valid, the waiting time associated with the transfer is bounded by a maximum value w, i.e. $\tau_{dep}(j, t') - (\tau_{arr}(i, t) + \Delta\tau_{fp}(p_t^i, p_t^j)) \leq w$.

9. The method according to claim 3, wherein for a transfer between trip t at index i and trip t' at index j to be valid, the waiting time associated with the transfer is bounded by a maximum value w, i.e. $\tau_{dep}(j, t') - (\tau_{arr}(i, t) + \Delta\tau_{fp}(p_t^i, p_t^j)) \leq w$.

10. The method according to claim 5, wherein for a transfer between trip t at index i and trip t' at index j to be valid, the waiting time associated with the transfer is bounded by a maximum value w, i.e. $\tau_{dep}(j, t') - (\tau_{arr}(i, t) + \Delta\tau_{fp}(p_t^i, p_t^j)) \leq w$.

11. The method according to claim 1, wherein a boarding time ($\tau_{bo}(l_r)$) and/or an alighting time ($\tau_{al}(l_r)$) are added respectively before the departure from the first station ($p_i^j$) and/or after the arrival at the second station ($p_t^i$).

12. The method according to claim 2, wherein a boarding time ($\tau_{bo}(l_r)$) and/or an alighting time ($\tau_{al}(l_r)$) are added respectively before the departure from the first station ($p_i^j$) and/or after the arrival at the second station ($p_t^i$).

13. The method according to claim 3, wherein a boarding time ($\tau_{bo}(l_r)$) and/or an alighting time ($\tau_{al}(l_r)$) are added respectively before the departure from the first station ($p_i^j$) and/or after the arrival at the second station ($p_t^i$).

14. The method according to claim 5, wherein a boarding time ($\tau_{bo}(l_r)$) and/or an alighting time ($\tau_{al}(l_r)$) are added respectively before the departure from the first station ($p_i^j$) and/or after the arrival at the second station ($p_t^i$).

15. The method according to claim 7, wherein a boarding time ($\tau_{bo}(l_r)$) and/or an alighting time ($\tau_{al}(l_r)$) are added respectively before the departure from the first station ($p_i^j$) and/or after the arrival at the second station ($p_t^i$).

16. The method according to claim 1, wherein (b) comprises defining a travel time between any pair of stations (p, q) of the non-scheduled line l such that $p=p_l^i$ and $q=p_l^j$ with $i<j$.

17. The method according to claim 2, wherein (b) comprises defining a travel time between any pair of stations (p, q) of the non-scheduled line l such that $p=p_l^i$ and $q=p_l^j$ with $i<j$.

18. The method according to claim 3, wherein (b) comprises defining a travel time between any pair of stations (p, q) of the non-scheduled line l such that $p=p_l^i$ and $q=p_l^j$ with $i<j$.

19. The method according to claim 5, wherein (b) comprises defining a travel time between any pair of stations (p, q) of the non-scheduled line l such that $p=p_l^i$ and $q=p_l^j$ with $i<j$.

20. The method according to claim 7, wherein (b) comprises defining a travel time between any pair of stations (p, q) of the non-scheduled line l such that $p=p_l^i$ and $q=p_l^j$ with $i<j$.

21. The method according to claim 11, wherein (b) comprises defining a travel time between any pair of stations (p, q) of the non-scheduled line l such that $p=p_l^i$ and $q=p_l^j$ with $i<j$.

22. The method according to claim 1, wherein the routing optimization algorithm computes the Pareto front.

23. The method according to claim 1, further comprising when considering transfer to a non-scheduled line at a station, proposing as a candidate trip the earliest compatible trip on the non-scheduled line from the station.

24. The method according to claim 23, further comprising building, for the non-scheduled line, a set ($\hat{R}(l)$) of pairs of an index of a station on the non-scheduled line and the earliest departure time of a trip from that station.

25. A method for computing at least one itinerary, each itinerary comprising a main part in a multimodal transportation network of predetermined stations, defined as a sequence of trips on scheduled or non-scheduled lines within the multimodal transportation network and transfers from a set of feasible transfers within the multimodal transportation network, to enable the building of itineraries that combine non-scheduled lines and scheduled lines, a scheduled line being a predetermined sequence of stations with known timetables, a non-scheduled line being a non-walking mode of transportation having no known timetable, the method comprising:
  (a) receiving from a user, via a user interface, a departure location and an arrival location:
  (b) electronically, preprocessing, using an electronic processor and electronic memory, the set of non-scheduled lines to obtain a set of feasible transfers between scheduled lines and non-scheduled lines;
  (c) electronically, determining, using an electronic processor and electronic memory, a set of possible initial trips as a function of the departure location, and a set of possible final trips as a function of the arrival location, in the multimodal transportation network;
  (d) electronically, performing, using an electronic processor and electronic memory, a routing optimization algorithm so as to build, among the itineraries having a main part from an initial trip belonging to the set of possible initial trips to a final trip belonging to the set of possible final trips, at least one optimal itinerary according to at least one criterion including an earliest arrival time, based upon trips on scheduled or non-scheduled lines and transfers between trips from the set of feasible transfer; and
  (e) outputting to the user, via a user interface, the at least one optimal itinerary for use by the user to plan a trip travelling in the multimodal transportation network.

26. The method according to claim 25, wherein the routing optimization algorithm computes the Pareto front.

27. The method according to claim 25, further comprising when considering transfer to a non-scheduled line at a station, electronically determining, using an electronic processor and electronic memory, as a candidate trip, the earliest compatible trip on the non-scheduled line from the station.

28. The method according to claim 27, further comprising electronically building, using an electronic processor and electronic memory, for the non-scheduled line, a set ($\hat{R}(l)$) of pairs of an index of a station on the non-scheduled line and the earliest departure time of a trip from that station.

29. A computer program product non-transitorily existent on a computer-usable medium for building at least one optimal itinerary for use by a user to plan a trip travelling in a multimodal transportation network according to a number of transfers in the multimodal transportation network by preprocessing a set of non-scheduled lines within a multimodal transportation network of predetermined stations to enable the building of itineraries that combine non-scheduled lines and scheduled lines, a scheduled line being a predetermined sequence of stations with known timetables, a non-scheduled line being a non-walking mode of transportation having no known timetable, comprising:
  code instructions, when the computer program product is executed on a computer, to execute a method for building at least one optimal itinerary for use by a user to plan a trip travelling in a multimodal transportation network;
  said code instructions cause receipt of, from a user, via a user interface, a departure location and an arrival location;
  said code instructions for each non-scheduled line (l) of the set of non-scheduled lines, associate, to each station ($p_i^j$) of a sequence of stations ($\vec{p}(l)$) defining the non-scheduled line (l), at least one time interval (I(l, j)) during which a trip on the non-scheduled line (l) can depart from the station ($p_i^j$);
  said code instructions for each first station ($p_i^j$) of a non-scheduled line (l) which is reachable from a second station ($p_t^i$) of a scheduled line, add to a set of feasible transfers between a scheduled line and a non-scheduled line, if there exists a trip (t) on the scheduled line such that a departure time at the first station ($p_i^j$) after transferring is compatible with the at least one time interval (I(l, j)) associated to the first station ($p_i^j$) the earliest transfer from the second station ($p_t^i$) on the trip (t) to the first station ($p_i^j$);
  said code instructions output the set of feasible transfers between a scheduled line and a non-scheduled line for computing at least one itinerary in the multimodal transportation network;
  said code instructions determine, based upon the set of feasible transfers, a set of possible initial trips as a function of the departure location and a set of possible final trips as a function of the arrival location, in a multimodal transportation network;
  said code instructions perform, using an electronic processor and electronic memory, a routing optimization algorithm so as to build, among itineraries having a main part from an initial trip belonging to the set of possible initial trips to a final trip belonging to the set of possible final trips, at least one optimal itinerary according to at least one criterion including an earliest arrival time, based upon trips on scheduled or non-scheduled lines and transfers between trips from the set of feasible transfer; and said code instructions cause an output to the user the at least one optimal itinerary for use by the user to plan a trip travelling in the multimodal transportation network.

30. The computer program product according to claim 29, wherein said code instructions generate a set of feasible transfers between scheduled lines and prune this set so as to obtain a reduced set of feasible transfers between scheduled lines.

31. The computer program product according to claim 29, wherein the departure time at the first station $p_i^j$ after transferring is considered to be compatible with the at least one time interval $(I(l, j))$ if there exists a instant $\tau \in I(l, j)$ such that the inequality $\tau_{arr}(i, t) + \Delta \tau_{fp}(p_t^i, p_i^j) \leq \tau$ is verified, wherein $\tau_{arr}(l, t)$ is the arrival time at the second station $p_t^i$ on trip t, $\Delta \tau_{fp}(p_t^i, p_i^j)$ is the transfer duration from the second station $p_t^j$ on trip t to the first station $p_i^j$.

32. The computer program product according to claim 29, wherein the earliest transfer from the second station $p_t^i$ on the trip t to the first station $p_i^j$ is the transfer to the first station $p_i^j$ on the earliest trip t' of the non-scheduled line l which is the earliest instant $\tau \in I(l, j)$ such that $\tau \geq \tau_{arr}(i, t) + \Delta \tau_{fp}(p_t^i, p_i^j)$.

33. The computer program product according to claim 29, wherein for a transfer between trip t at index i and trip t' at index j to be valid, the waiting time associated with the transfer is bounded by a maximum value w, i.e. $\tau_{dep}(j, t') - (\tau_{arr}(i, t) + \Delta \tau_{fp}(p_t^i, p_t^j)) \leq w$.

34. The computer program product according to claim 29, wherein a boarding time $(\tau_{bo}(l_t))$ and/or an alighting time $(\tau_{al}(l_t))$ are added respectively before the departure from the first station $(p_i^j)$ and/or after the arrival at the second station $(p_t^i)$.

35. The computer program product according to claim 29, wherein the process further comprises defining a travel time between any pair of stations (p, q) of the non-scheduled line/such that $p=p_t^i$ and $q=p_t^j$ with i<j.

36. The computer program product according to claim 32, wherein the computer program product is a computer-readable medium.

37. A computer program product non-transitorily existent on a computer-usable medium for computing at least one itinerary based upon a departure location and an arrival location, each itinerary comprising a main part in a multimodal transportation network of predetermined stations, defined as a sequence of trips on scheduled or non-scheduled lines within the multimodal transportation network and transfers from a set of feasible transfers within the multimodal transportation network, to enable the building of itineraries that combine non-scheduled lines and scheduled lines, a scheduled line being a predetermined sequence of stations with known timetables, a non-scheduled line being a non-walking mode of transportation having no known timetable, comprising:

code instructions, when the computer program product is executed on a computer, to execute a method for computing at least one itinerary based upon a departure location and an arrival location, each itinerary comprising a main part in a multimodal transportation network of predetermined stations;

said code instructions cause receipt of, from a user, via a user interface, a departure location and an arrival location;

said code instructions preprocess the set of non-scheduled lines to obtain the set of feasible transfers between scheduled lines and non-scheduled lines;

said code instructions determine a set of possible initial trips as a function of the departure location, and a set of possible final trips as a function of the arrival location, in the multimodal transportation network;

said code instructions perform a routing optimization algorithm so as to select, among the itineraries having a main part from an initial trip belonging to the set of possible initial trips to a final trip belonging to the set of possible final trips, at least one optimal itinerary according to at least one criterion including the earliest arrival time, when considering both trips on scheduled or non-scheduled lines and transfers between trips from the set of feasible transfer;

said code instructions cause an output to the user the at least one optimal itinerary for use by the user to plan a trip travelling in the multimodal transportation network.

38. The computer program product according to claim 37, wherein the routing optimization algorithm computes the Pareto front.

39. The computer program product according to claim 37, wherein the computer program product is a computer-readable medium.

* * * * *